UNITED STATES PATENT OFFICE.

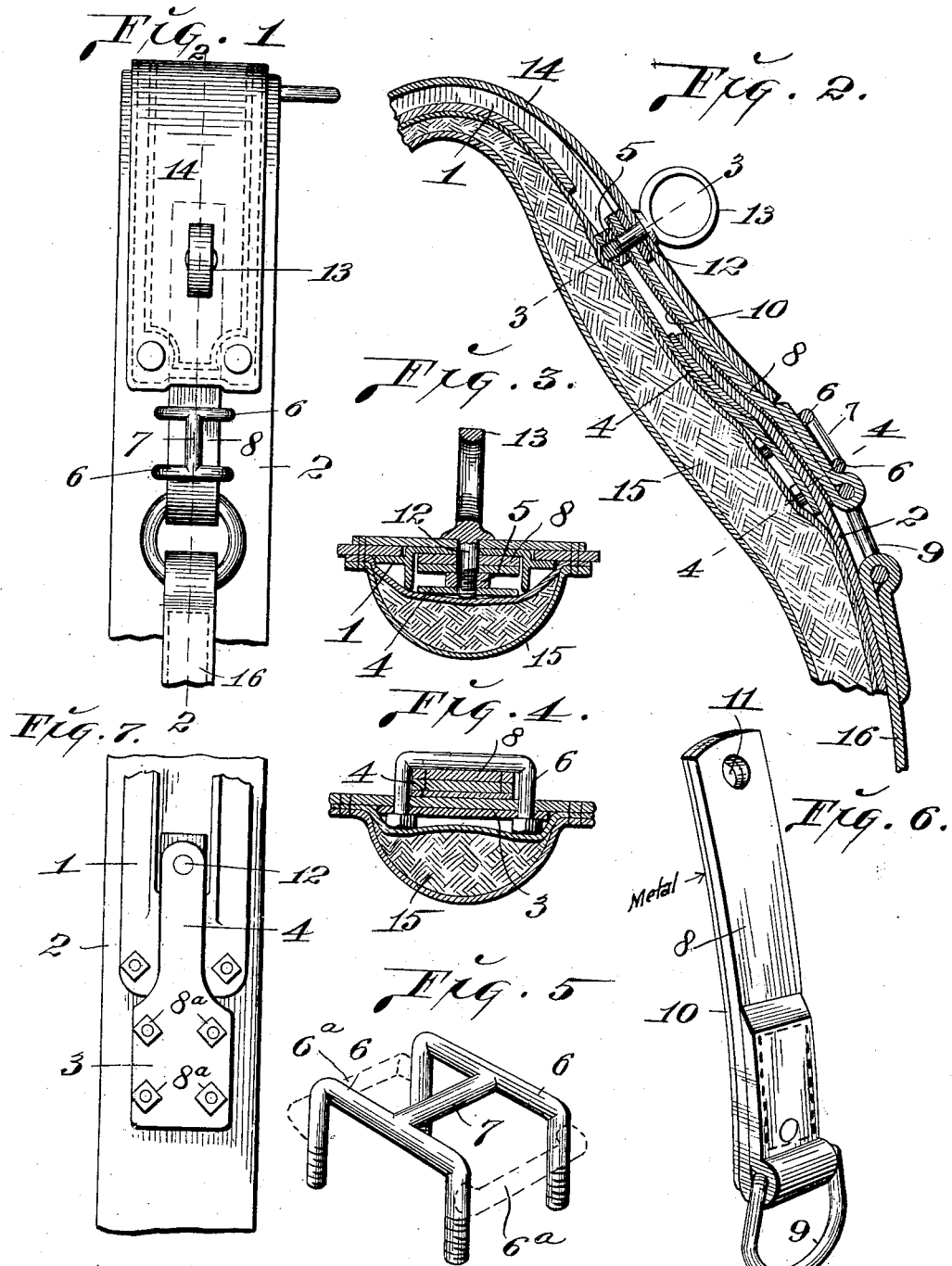

JOHN CRAMER, OF ST. LOUIS, MISSOURI, ASSIGNOR OF ONE-HALF TO GEORGE GRASSMUCK, OF ST. LOUIS, MISSOURI.

COMBINATION BACK-BAND LOOP.

No. 826,316.  Specification of Letters Patent.  Patented July 17, 1906.

Application filed August 4, 1905. Serial No. 272,782.

*To all whom it may concern:*

Be it known that I, JOHN CRAMER, a citizen of the United States, and a resident of St. Louis, Missouri, have invented certain new and useful Improvements in Combination Back-Band Loops, of which the following is a specification containing a full, clear, and exact description, reference being had to the accompanying drawings, forming a part hereof.

My invention relates to a back-band loop; and the object of my invention is to provide simple and inexpensive means whereby loops are detachably secured to the harness-saddle.

My invention consists in certain new and novel features of construction and arrangements of parts that will hereinafter be more fully set forth, pointed out in my claims, and illustrated in the accompanying drawings, in which—

Figure 1 is a side elevation of a harness-saddle and showing a loop attached thereto. Fig. 2 is a vertical section taken on line 2 2 of Fig. 1. Fig. 3 is a detail section taken on the line 3 3 of Fig. 2. Fig. 4 is a detail section taken on the line 4 4 of Fig. 2. Fig. 5 is a perspective view of a hook I make use of in carrying out my invention. Fig. 6 is a perspective view of the loop that is detachably secured to the harness-saddle. Fig. 7 is an elevation of a portion of the harness-saddle and showing the pad removed therefrom.

Referring by numerals to the accompanying drawings, 1 indicates the usual metallic frame of the harness-saddle, which is secured in any suitable manner to the broad back-band strap 2.

3 indicates a metallic plate that is secured to the strap 2 just below the end of the frame 1, and said plate is provided with an integral upwardly-extending tongue 4, that projects upwardly beneath the lower end of the frame 1, and it is there provided on its upper face with a screw-threaded nut 5, the same being fixed to the tongue in any suitable manner. The hook that I make use of in securing the plate 3 to the strap 2 comprises a pair of inverted-U-shaped members 6, which are joined by the centrally-arranged bar 7. The ends of the members 6 are screw-threaded and pass through the strap 2, and plate 3 and nuts 8$^a$ are located upon the threaded ends of said members.

The detachable loop of my improved device comprises a short leather strap 8, the lower end of which passes through a ring 9 and is folded back and secured in any suitable manner to the body of said strap. Secured in any suitable manner to the inside face of this strap 8 is a metallic plate 10, and formed through the upper ends of the strap 8 and plate 10 is an aperture 11. The detachable loop thus formed is of such a length as that when it is passed beneath the inverted-U-shaped members 6 and moved upwardly therethrough to its limit of movement the aperture 11 in the upper end of said loop will coincide with the aperture in the nut 5. The shank 12 of the turret 13 passes through the aperture 11, and the screw-threaded end of said shank enters the nut 5. This very effectually secures the loop to the harness-saddle, though by removing the turret said loop may be quickly and easily disengaged from said saddle.

It will be readily understood that the construction just described is arranged at each end of the frame 1 and on both sides of the harness-saddle.

The harness-saddle is provided with the usual ornamental cover-piece 14 and with a pad 15 on its inner side, the latter being secured in position in any suitable manner.

The upper ends of the usual girth-straps 16 are secured in any suitable manner to the rings 9.

The plates 3 are very rigidly held to the strap 2 by means of the inverted-U-shaped members 6, and the shanks 12 of the turrets 13, passing through portions of the frame 1 and into nuts carried by the upper ends of said plates, form a very secure anchor and fastening device for the upper ends of the detachable loops. The loops are reinforced with the metallic plates 10 and are therefore strong and durable.

My improved construction is very simple and inexpensive, is adapted for use on any form of a harness-saddle or back-band, and provides means whereby the loops are rigidly secured to and readily detachable from said saddles or back-bands.

In some instances I find it advantageous to make use of horizontal bars, such as 6$^a$, that are formed integral with the vertical portions of the inverted-U-shaped members 6, this arrangement providing means for attaching certain straps used in very light harness, such as worn by race-horses. (See dotted lines, Fig. 5.)

I claim—

1. The combination with a harness-saddle or back-band, of plates rigidly secured to the under sides of the ends of the saddle or back-band, nuts rigidly fixed to the upper ends of said plates, loops detachably positioned on top of the lower ends of the saddle or back-band, reinforcing-plates on the under sides of said loops, and turrets having their shanks removably seated in the upper ends of the loops and nuts; substantially as specified.

2. The combination with a harness-saddle or back-band, of plates positioned on the under side of the lower ends of the saddle or back-band, nuts fixed to the upper ends of said plates, inverted-U-shaped members securing said plates in position, loops extending beneath the U-shaped members, reinforcing-plates secured to the under sides of said loops, there being coinciding apertures formed in the upper ends of the reinforcing-plates and loops, and turrets having their shanks passing through said coinciding apertures and seated in the nuts; substantially as specified.

In testimony whereof I have signed my name to this specification in presence of two subscribing witnesses.

JOHN CRAMER.

Witnesses:
M. P. SMITH,
JOHN C. HIGDON.